US009803060B2

(12) United States Patent
Wang et al.

(10) Patent No.: US 9,803,060 B2
(45) Date of Patent: Oct. 31, 2017

(54) COMPOSITIONS AND METHOD FOR MAKING HOLLOW NANOPARTICLES FROM METAL SOAPS

(75) Inventors: Xiaorong Wang, Hudson, OH (US); Mindaugas Rackaitis, Massillon, OH (US); Pat Sadhukhan, Akron, OH (US); Victor J. Foltz, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 103 days.

(21) Appl. No.: 12/878,332

(22) Filed: Oct. 4, 2010

(65) Prior Publication Data
US 2011/0060062 A1    Mar. 10, 2011

Related U.S. Application Data

(60) Provisional application No. 61/241,073, filed on Sep. 10, 2009.

(51) Int. Cl.
*B32B 25/00* (2006.01)
*C08J 9/00* (2006.01)
*C08J 9/32* (2006.01)

(52) U.S. Cl.
CPC .............. *C08J 9/32* (2013.01); *C08J 9/0071* (2013.01); *C08J 2321/00* (2013.01); *Y10T 428/2982* (2015.01)

(58) Field of Classification Search
CPC ........ A61K 2800/413; A61K 2800/621; A61K 8/022; A61K 8/0283; A61K 8/06; A61K 8/19; A61K 2800/412; A61K 8/26; A61K 8/11; B29C 43/146; B29C 43/305; C08K 5/098; C08K 5/09; C08L 2205/20; B82Y 30/00; C08J 9/0071; C08J 9/32; C08J 2321/00; Y10T 428/2982
USPC ............ 424/493, 497, 451; 428/402–402.24, 428/407, 403, 423.1, 474.4, 404; 427/126.3, 389.9, 213.3–213.36; 264/53, 264/41, 4–4.7; 521/50, 146, 57, 56, 76, 521/142
See application file for complete search history.

(56) References Cited

U.S. PATENT DOCUMENTS

| | | |
|---|---|---|
| 2,447,064 A | 8/1948 | Gebhart et al. |
| 2,599,553 A | 6/1952 | Hotten |
| 2,768,996 A | 10/1956 | Bulloff |
| 3,018,291 A | 1/1962 | Anderson et al. |
| 3,024,237 A | 3/1962 | Drummon et al. |
| 3,172,892 A | 3/1965 | Le Suer et al. |
| 3,219,666 A | 11/1965 | Norman et al. |
| 3,223,495 A | 12/1965 | Calvino et al. |
| 3,272,746 A | 9/1966 | La Suer et al. |
| 3,361,673 A | 1/1968 | Stuart et al. |
| 3,367,864 A | 2/1968 | Elliott et al. |
| 3,443,918 A | 5/1969 | Kautsky et al. |
| 3,461,108 A | 8/1969 | Heilman et al. |
| 3,501,422 A | 3/1970 | Nordsiek et al. |
| 3,560,455 A | 2/1971 | Hazen et al. |
| 3,560,456 A | 2/1971 | Hazen et al. |
| 3,560,457 A | 2/1971 | Hazen et al. |
| 3,580,893 A | 5/1971 | Heilman et al. |
| 3,706,704 A | 12/1972 | Heilman et al. |
| 3,729,450 A | 4/1973 | Galiano et al. |
| 3,729,451 A | 4/1973 | Blecke et al. |
| 3,738,948 A | 6/1973 | Dunnom |
| 3,836,511 A | 9/1974 | O'Farrell et al. |
| 3,912,764 A | 10/1975 | Palmer et al. |
| 3,944,552 A | 3/1976 | Lawrence |
| 3,990,978 A | 11/1976 | Hill |
| 3,998,992 A | 12/1976 | Nakamura |
| 4,003,393 A | 1/1977 | Jaggard et al. |
| 4,007,128 A | 2/1977 | Poklacki |
| 4,016,931 A | 4/1977 | Cryar, Jr. |
| 4,031,014 A | 6/1977 | Griffin, Jr. |
| 4,038,207 A | 7/1977 | Poklacki et al. |
| 4,046,524 A | 9/1977 | van Hesden |
| 4,078,609 A | 3/1978 | Pavlich |
| 4,094,795 A | 6/1978 | DeMartino et al. |
| 4,104,173 A | 8/1978 | Gay et al. |
| 4,115,285 A | 9/1978 | van Hesden |
| 4,137,400 A | 1/1979 | DeMartino et al. |
| 4,143,007 A | 3/1979 | DeMartino |
| 4,143,715 A | 3/1979 | Pavlich |
| 4,152,289 A | 5/1979 | Griffin, Jr. |

(Continued)

FOREIGN PATENT DOCUMENTS

| | | |
|---|---|---|
| EP | 0355895 B1 | 2/1990 |
| EP | 0542380 A1 | 5/1993 |

(Continued)

OTHER PUBLICATIONS

Kim et al., Journal of American Chemical Society, 129, pp. 5812-5813, 2007.*
Japanese Office Action, App. No. 2009000430, dated Jun. 18, 2013 (7 pages).
Cai, Wenwen, Office Action in U.S. Appl. No. 12/347,404, Sep. 19, 2013 (16 pages).
Cai, Wenwen, Office Action in U.S. Appl. No. 12/347,404, Oct. 24, 2013 (13 pages).
Notification of First Office Action, The State Intellectual Property Office of P.R. China, Application No. 2009801329723.3, Aug. 28, 2012. (6 pages).
Lowe, Chelsea M., Non-Final Rejection, U.S. Appl. No. 13/000,696, Sep. 11, 2012. (8 pages).

(Continued)

*Primary Examiner* — Irina S Zemel
(74) *Attorney, Agent, or Firm* — Meredith E. Hooker; Nathan T. Lewis

(57) ABSTRACT

Compositions and methods for preparing at least partially hollow nanoparticles having an outer shell comprising a one or more molecules and/or residues derived from a metal soap, where the nanoparticles each comprise a continuous inner void space that averages at least 10 percent of the volume of each of the nanoparticles. Such at least partially hollow nanoparticles can be employed in a variety of applications including, but not limited to, tire manufacturing.

46 Claims, No Drawings

(56) References Cited

U.S. PATENT DOCUMENTS

| | | |
|---|---|---|
| 4,152,499 A | 5/1979 | Boerzel et al. |
| 4,153,066 A | 5/1979 | Griffin, Jr. |
| 4,153,649 A | 5/1979 | Griffin, Jr. |
| 4,169,798 A | 10/1979 | DeMartino |
| 4,169,818 A | 10/1979 | DeMartino |
| 4,172,055 A | 10/1979 | DeMartino |
| 4,174,283 A | 11/1979 | Griffin, Jr. |
| 4,200,539 A | 4/1980 | Burnham et al. |
| 4,200,540 A | 4/1980 | Burnham |
| 4,234,435 A | 11/1980 | Meinhardt et al. |
| 4,301,025 A | 11/1981 | Brady et al. |
| 4,316,810 A | 2/1982 | Burnham |
| 4,322,336 A | 3/1982 | Machurat et al. |
| 4,410,437 A | 10/1983 | Erdman |
| 4,446,281 A | 5/1984 | Takamatsu et al. |
| 4,450,254 A | 5/1984 | Isley et al. |
| 4,473,408 A | 9/1984 | Purinton, Jr. |
| 4,507,213 A | 3/1985 | Daccord et al. |
| 4,537,700 A | 8/1985 | Purinton, Jr. |
| 4,595,513 A | 6/1986 | Morgenthaler et al. |
| 4,622,155 A | 11/1986 | Harris et al. |
| 4,781,845 A | 11/1988 | Syrinek et al. |
| 4,787,994 A | 11/1988 | Thorne et al. |
| 4,791,140 A | 12/1988 | Fukasawa et al. |
| 4,795,574 A | 1/1989 | Syrinek et al. |
| 4,860,821 A | 8/1989 | Hagewood |
| 4,877,894 A | 10/1989 | Huddleston |
| 4,880,444 A | 11/1989 | Savins et al. |
| 4,910,267 A | 3/1990 | Oyama et al. |
| 4,975,497 A | 12/1990 | Tate et al. |
| 5,034,139 A | 7/1991 | Reid et al. |
| 5,057,233 A | 10/1991 | Huddleston |
| 5,110,485 A | 5/1992 | Huddleston |
| 5,112,507 A | 5/1992 | Harrison |
| 5,137,978 A | 8/1992 | Degonia et al. |
| 5,137,980 A | 8/1992 | DeGonia et al. |
| 5,150,754 A | 9/1992 | Phelps et al. |
| 5,175,225 A | 12/1992 | Ruhe, Jr. |
| 5,190,675 A | 3/1993 | Gross |
| 5,202,035 A | 4/1993 | Huddleston |
| 5,271,464 A | 12/1993 | McCabe |
| 5,281,023 A | 1/1994 | Cedillo et al. |
| 5,286,799 A | 2/1994 | Harrison et al. |
| 5,319,030 A | 6/1994 | Harrison et al. |
| 5,393,309 A | 2/1995 | Cherpeck |
| 5,441,340 A | 8/1995 | Cedillo et al. |
| 5,514,645 A | 5/1996 | McCabe et al. |
| 5,523,417 A | 6/1996 | Blackborrow et al. |
| 5,565,528 A | 10/1996 | Harrison et al. |
| 5,590,958 A | 1/1997 | Dearing, Sr. et al. |
| 5,616,668 A | 4/1997 | Harrison et al. |
| 5,624,182 A | 4/1997 | Dearing, Sr. et al. |
| 5,625,004 A | 4/1997 | Harrison et al. |
| 5,777,025 A | 7/1998 | Spencer et al. |
| 5,792,729 A | 8/1998 | Harrison et al. |
| 5,854,327 A | 12/1998 | Davis et al. |
| 5,916,961 A | 6/1999 | Hergenrother et al. |
| 5,922,792 A | 7/1999 | Widerman et al. |
| 5,972,852 A | 10/1999 | Robson |
| 5,972,853 A | 10/1999 | Boffa et al. |
| 5,981,662 A | 11/1999 | D'Sidocky et al. |
| 5,990,053 A | 11/1999 | Jones et al. |
| 6,004,908 A | 12/1999 | Graham et al. |
| 6,054,417 A | 4/2000 | Graham et al. |
| 6,133,354 A | 10/2000 | Wang et al. |
| 6,174,989 B1 | 1/2001 | D'Sidocky et al. |
| 6,204,354 B1 | 3/2001 | Wang et al. |
| 6,207,763 B1 | 3/2001 | Wang et al. |
| 6,261,998 B1 | 7/2001 | Amin et al. |
| 6,262,130 B1 | 7/2001 | Derian et al. |
| 6,271,409 B1 | 8/2001 | Geib |
| 6,297,201 B1 | 10/2001 | Geib |
| 6,302,209 B1 | 10/2001 | Thompson, Sr. et al. |
| 6,342,468 B1 | 1/2002 | Geib |
| 6,350,800 B1 | 2/2002 | Wang et al. |
| 6,353,054 B1 | 3/2002 | Wang et al. |
| 6,359,064 B1 | 3/2002 | Wang et al. |
| 6,369,166 B1 | 4/2002 | Wang et al. |
| 6,372,855 B1 | 4/2002 | Chino et al. |
| 6,384,134 B1 | 5/2002 | Hall et al. |
| 6,401,776 B1 | 6/2002 | Wang et al. |
| 6,403,724 B1 | 6/2002 | Wang |
| 6,417,259 B1 | 7/2002 | Wang et al. |
| 6,458,881 B1 | 10/2002 | Pan et al. |
| 6,602,828 B2 | 8/2003 | Armin et al. |
| 6,632,781 B2 | 10/2003 | Harrison et al. |
| 6,699,813 B2 | 3/2004 | Luo et al. |
| 6,706,823 B2 | 3/2004 | Wang et al. |
| 6,719,053 B2 | 4/2004 | Thompson |
| 6,838,089 B1 * | 1/2005 | Carlsson et al. .............. 424/450 |
| 6,849,581 B1 | 2/2005 | Thompson et al. |
| 7,314,850 B2 | 1/2008 | Taylor et al. |
| 7,328,744 B2 | 2/2008 | Taylor et al. |
| 7,429,393 B2 | 9/2008 | Wang et al. |
| 7,521,400 B2 | 4/2009 | Samuel |
| 7,534,745 B2 | 5/2009 | Taylor et al. |
| 7,563,457 B2 * | 7/2009 | Cha et al. .............. 424/491 |
| 7,700,673 B2 | 4/2010 | Wang et al. |
| 2002/0022085 A1 | 2/2002 | Thise et al. |
| 2002/0188064 A1 | 12/2002 | Wang et al. |
| 2003/0123039 A1 | 7/2003 | Wang et al. |
| 2003/0130398 A1 | 7/2003 | Wang |
| 2003/0130401 A1 | 7/2003 | Lin et al. |
| 2004/0144464 A1 | 7/2004 | Rhyne et al. |
| 2005/0022915 A1 | 2/2005 | Bowen, III et al. |
| 2006/0223945 A1 | 10/2006 | Hollingshurst et al. |
| 2007/0015853 A1 | 1/2007 | Weng et al. |
| 2007/0208122 A1 | 9/2007 | Bhandarkar et al. |
| 2008/0153972 A1 | 6/2008 | Wang et al. |
| 2008/0286374 A1 * | 11/2008 | Wang et al. .................. 424/497 |
| 2010/0004368 A1 | 1/2010 | Wang et al. |
| 2010/0180995 A1 * | 7/2010 | Teratani et al. .............. 152/157 |
| 2011/0039994 A1 | 2/2011 | Wang et al. |

FOREIGN PATENT DOCUMENTS

| | | | |
|---|---|---|---|
| EP | 0570159 A1 | 11/1993 | |
| EP | 0602863 B1 | 6/1994 | |
| EP | 0864606 B1 | 9/1998 | |
| EP | 1270657 B1 | 1/2003 | |
| EP | 0535642 | 4/2005 | |
| EP | 1803771 A1 | 7/2007 | |
| GB | 695113 | 12/1949 | |
| JP | H05311008 A | 11/1993 | |
| JP | 09151276 A | 6/1997 | |
| JP | 2004175134 A | 6/2004 | |
| JP | 2006063094 A | 3/2006 | |
| JP | 2006063094 * | 8/2006 | ............. C08L 21/00 |
| WO | 9008170 A1 | 7/1990 | |
| WO | WO/02/96677 | 5/2002 | |
| WO | 02096677 A1 | 12/2002 | |
| WO | 2002096677 | 12/2002 | |
| WO | 2004058874 | 7/2004 | |
| WO | 2004058874 A1 | 7/2004 | |
| WO | 2007070063 | 6/2007 | |
| WO | 2009070063 A1 | 6/2009 | |

OTHER PUBLICATIONS

Cai, Wenwen, Office Action in U.S. Appl. No. 12/347,404, Apr. 13, 2011 (9 pages).

Cai, Wenwen. Non-Final Office Action U.S. Appl. No. 12/347,404 Apr. 13, 2011 (9 pp.).

Admasu, Atnaf S. Advisory Action dated Nov. 10, 2009 from U.S. Appl. No. 11/615,659 (8 pp.).

Admasu, Atnaf S. Final Office Action dated Aug. 18, 2009 from U.S. Appl. No. 11/615,659 (8 pp.).

Admasu, Atnaf S. Office Action dated Jan. 21, 2009 from U.S. Appl. No. 11/615,659 (10 pp.).

Mathew, George, et al. "Organogels with Complexes of Ions and Phosphorus-Containing Amphiphiles as Gelators. Spontneous Gelation by in Situ Complexation", Langmuir, 24, pp. 3537-3544 (2008).

(56) References Cited

OTHER PUBLICATIONS

Weill, J. et al. "Reaction du Polyisobutene Chlore Sur L'Anhydride Maleique: Mecanisme; Catalyse Par L'Anhydride Dichloromalcique", Revue de L'Institut Francais due Petrole, vol. 40, No. 1, pp. 77-89 (Jan.-Feb. 1985).
Cai, Wenwen. Final Office Action U.S. Appl. No. 12/347,404 Aug. 26, 2011 (8 pp.).
Hayashi et al. Database WPI Week 199001, Thomas Scientific, Long, GB; AN 1990-004108 (1 pg.).
English Translation of Nov. 30, 2011 Office Action from Chinese Patent Application No. 200810191041.8 (6 pp.).
EP Office Action, Jan. 9, 2008, from European Application No. 06256456.2 (6 pp).
EP Office Action, Schmitt J. 08254195.2-2102 Dec. 28, 2009 (1 pp.).
EP Office Action, Schmitt J. 08254195.2-2102 Aug. 26, 2010 (5 pp.).
EP Search Report, Schmitt J. 08254195.2-2102 Jun. 2, 2009 (7 pp.).
Funkhouser, Gary P. et al. "Rheological Comparison of Organogelators Based on Iron and Aluminum Complexes of Dodecylmethylphosphinic Acid and Methyl Dodecanephosphonic Acid", Langmuir, vol. 25, Issue 15, pp. 8672-8677 (2009).
Gaskins, Frederick H. et al. "Rheology of Aluminum Dilaurate in Toluene", Transactions of Society of Rheology, vol. 13, No. pp. 17-38 (1969).
Kim, Gye Sook. International Search Report from PCT/US2009/. 048834, 4 pp. (Feb. 2, 2010).
Wang, Xiaorong et al. "Gelling nature of aluminum soaps in oils", Journal of Colloid and Interface Science, 331, pp. 335-342 (Nov. 13, 2008).
Trappe, V. et al. "Scaling to of the Viscoelasticity of Weakly Attractive Particles", Physical Review Letters, vol. 85, No. 2, pp. 449-452 (Jul. 10, 2000).
Sun, Yuejian. English translation of Oct. 8, 2010 First Office Action from Chinese Patent Application No. 200610170337.2 (10 pp.).
Mettler, Rolf-Martin. Apr. 10, 2007 extended European search report from European Patent Application No. 06256456.2 (6 pp.).
Mohajer, Y. et al. "New Polyisobutylene-Based Model Elastomeric Ionomers. VI. The Effect of Excess Neutralizing Agents on Solid-State Mechanical Properties", Applied Polymer Science, vol. 29, No. 6, pp. 1943-1984).
Mysels, Karol J. "Studies of Aluminum Soaps: IX. Electron Microscope View of Lyophilized Aluminum Laurate", The Journal of General Physiology, pp. 159-161 (Jul. 15, 1946).
Nora, Angelo et al. "Metallic Soaps", Internet article, XP-002524032, pp. 1-16 (Sep. 15, 2001).
Ow, Say Kyoun. "Investigation of the Role of Sulfate Ions in the Reaction Between Tetrahydroabietic Acid Monolayers and Aluminum Ions", The Institute of Paper Chemistry, Doctor's Dissertation, pp. 1-156 (Jun. 1974).
Scott, Angela C. Final Office Action dated Jun. 9, 2008 from U.S. Appl. No. 11/646,981 (6 pp.).
Scott, Angela C. Final Office Action dated Sep. 2, 2010 from U.S. Appl. No. 11/646,981 (7 pp.).
Scott, Angela C. Office Action dated Nov. 24, 2008 from U.S. Appl. No. 11/646,981 (5 pp.).
Scott, Angela C. Office Action dated Nov. 28, 2007 from U.S. Appl. No. 11/646,981 (7 pp.).
Scott, Angela C. Office Action dated Mar. 26, 2010 from U.S. Appl. No. 11/646,981 (6 pp.).
Scott, Angela C. Office Action dated Jul. 7, 2009 from U.S. Appl. No. 11/646,891 (6 pp.).
Scott, Angela C. Final Office Action dated Jan. 8, 2010 from U.S. Appl. No. 11/646,981 (6 pp.).
Lee, Doris L. Office Action Dated Jul. 11, 2012 from U.S. Appl. No. 12/827,361 (24 pp.).
Cai, Wenwen, Final Office Action for U.S. Appl. No. 12/347,404, May 9, 2013 (12 pp.).
Machine translation of JP 2006063094 A (10 pages) (translated Jan. 8, 2013).
Non-Final Rejection, U.S. Appl. No. 12/347,404 (12 pages) (notification date Jan. 22, 2013).
Bauer, et al., "Entrance Effects in Capillary Flow of Aluminun Dilaurate-Toluene Gels", In Journal of Physical Chemistry, vol. 62, Oct. 1958, pp. 1245-1247.
Bauer, et al., "Flow Properties and Structure of Peptized Aluminum Soap-Hydrocarbon Gels", In Journal of Physical Chemistry, vol. 62, Jan. 1958, pp. 106-110..
Harple, et al., "Infared Absorption Spectra of Aluminum Soaps", In Analytical Chemistry, vol. 24, No. 4, Apr. 1952, pp. 635-638.
Ludke, et al., "Mechanism of Peptization of Aluminum Soap-Hydrocarbon Gels Based Upon Infared Studies", In Journal of Physical Chemistry, vol. 59, Mar. 1955, pp. 222-225.
McGee, Charles G., "Aluminum Momolaurate and Proposed Structures for Aluminum Soaps", In American Chemical Society, vol. 71, Jan. 1949, pp. 278-282.
Weber, et al., "Flow Properties of Aluminum Dilaurate-Toluene Gels", In Journal of Physical Chemistry, vol. 62, Mar. 1956, pp. 270-273.

\* cited by examiner

COMPOSITIONS AND METHOD FOR MAKING HOLLOW NANOPARTICLES FROM METAL SOAPS

BACKGROUND

1. Field

One or more embodiments of the invention relate to at least partially hollow nanoparticles formed from certain metal soaps and their use in a variety of applications.

2. Description of Related Art

In the tire industry, rubber compositions are engineered to have a balance of properties such as, for example, durability (e.g., tensile strength and tear resistance), rolling resistance, and traction. Many types of rubber additives have been developed to enhance such properties. However, modifying rubber compositions to improve one of these properties can have an adverse impact on one or more other desirable properties. Accordingly, advancements in rubber additives are still needed to produce rubber compositions having an appropriate balance of desired properties. Additionally, many other industries employ additives, such as nanoparticles, in a wide variety of applications where improvements are desired.

SUMMARY

One embodiment of the invention concerns a composition comprising: an at least partially hollow nanoparticle having an outer shell comprising one or more molecules and/or residues derived from a metal soap, wherein the at least partially hollow nanoparticle comprises at least one continuous inner void space that constitutes at least 10 percent of the volume of the nanoparticle, wherein the metal of the metal soap comprises a transition metal, a post-transition metal, a metalloid, a lanthanoid, and/or an actinoid.

Another embodiment of the invention concerns a rubber composition comprising: a rubber matrix having dispersed therein a plurality of at least partially hollow nanoparticles having an outer shell comprising one or more molecules and/or residues derived from a metal soap, wherein the at least partially hollow nanoparticles each have at least one continuous inner void space that averages at least 10 percent of the volume of each of the at least partially hollow nanoparticles.

Yet another embodiment of the invention concerns a process for making at least partially hollow nanoparticles. The process of this embodiment comprises: dispersing a metal soap into an organic solvent thereby forming the at least partially hollow nanoparticles, wherein the at least partially hollow nanoparticles each have a continuous inner void space that averages at least 10 percent of the volume of each of the at least partially hollow nanoparticles, wherein the metal of the metal soap comprises a transition metal, a post-transition metal, a metalloid, a lanthanoid, and/or an actinoid.

DETAILED DESCRIPTION

In accordance with one or more embodiments of the present invention, there is provided a composition comprising one or more at least partially hollow nanoparticles each having an outer shell comprising a plurality of molecules and/or residues derived from a metal soap, and a continuous inner void space that constitutes at least a portion of the nanoparticle's core. The at least partially hollow nanoparticles can initially be prepared by dispersing a metal soap in an organic solvent. Thereafter, the initial nanoparticles can be stabilized via crosslinking. The at least partially hollow nanoparticles can be employed in a variety of applications, including, but not limited to, being combined with a rubber matrix for use in tire manufacture.

As just mentioned, various embodiments of the present invention concern at least partially hollow nanoparticles each having an outer shell. The outer shell of the nanoparticles can comprise a plurality of molecules and/or residues derived from a metal soap. As used herein the term "residue" shall denote the remaining portion of a molecule that has been incorporated into a larger molecular structure, such as, for example, by crosslinking or polymerization. As used herein, the term "metal soap" shall denote an amphiphilic molecule comprising at least one metal atom. In one or more embodiments, suitable metal soaps can be insoluble in water. In other embodiments, suitable metal soaps can be soluble in non-polar organic solvents. Additionally, suitable metal soaps can be biocompatible. As used herein, the term "biocompatible" shall denote the property of neither being toxic nor injurious to biological systems.

In one or more embodiments, the metal atom of the metal soaps can comprise one or more metal atoms selected from transition metals, post-transition metals, metalloids, lanthanoids, and/or actinoids. In various embodiments, the metal atom of the metal soap can be selected from Group III (IUPAC Group 13) metals or transition metals excluding zinc, nickel, and copper. Specific examples of metals suitable for use as the metal atom of the metal soap include, but are not limited to, scandium, yttrium, lanthanum, actinium, chromium, iron, cobalt, ruthenium, iridium, gallium, indium, titanium, manganese, germanium, tin, aluminum, lead, zinc, mercury, and cadmium. In one or more embodiments, the metal atom of the metal soap can comprise at least one metal selected from the group consisting of aluminum, iron, titanium, and cobalt. In various embodiments, the metal atom of the metal soap comprises aluminum. Additionally, the metal atom of the metal soap can have a valence of at least 2 or at least 3.

In one or more embodiments, the metal soap can comprise at least one metal atom and one or more moieties derived from a carboxylic acid. In various embodiments, the above-described metal atom can be covalently bonded to the carboxylic acid derivative. The carboxylic acid can be any carboxylic acid having at least 2 carbon atoms. Additionally, the carboxylic acid can be a monocarboxylic acid. Furthermore, the carboxylic acid can be a $C_2$ to $C_5$ acid, or a fatty acid having at least 6 carbon atoms. In one or more embodiments, the carboxylic acid can be a $C_6$ to $C_{22}$ fatty acid, or a higher fatty acid, such as a $C_{23}$ to $C_{50}$ fatty acid.

In one or more embodiments, the carboxylic acid can be selected from one or more straight-chain, saturated carboxylic acids such as, for example, acetic acid, propionic acid, butyric acid, valeric acid, caproic acid, enanthic acid, caprylic acid, pelargonic acid, capric acid, lauric acid, myristic acid, palmitic acid, stearic acid, and arachidic acid. In other embodiments, the carboxylic acid can be selected from one or more branched, saturated carboxylic acids such as, for example, ethylhexanoic acid.

In still other embodiments, the carboxylic acid can be selected from one or more mono- or polyunsaturated, straight or branched carboxylic acids. For example, the carboxylic acid can comprise a mono- or polyunsaturated $C_2$ to $C_5$ acid, a mono- or polyunsaturated carboxylic acid having at least 6 carbon atoms, a mono- or polyunsaturated $C_6$ to $C_{22}$ fatty acid, or higher mono- or polyunsaturated fatty acids such as $C_{23}$ to $C_{50}$ fatty acids. In one or more embodiments, at least one of the C—C double bonds of the carboxylic acid can be sulfur-curable. Additionally, when the carboxylic acid is polyunsaturated, the multiple C—C double bonds can be conjugated. Furthermore, carboxylic acids comprising one or more double bonds can be used in either their cis- or trans-form. In one or more embodiments, at least one double bond can be between two non-terminal carbons in the hydrocarbyl group of the carboxylic acid. Examples of suitable unsaturated carboxylic acids include, but are not limited to, oleic acid, linoleic acid, α-linolenic acid, γ-linolenic acid, arachidonic acid, and erucic acid. In one or more embodiments, the metal soap comprises a carboxylic acid moiety derived from oleic acid. As is commonly known in the art, oleic acid refers to the cis-form of 9-octadecenoic acid.

In one or more embodiments, suitable metals soaps can have the formula:

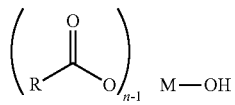

where M represents the metal of the metal soap, R can be any organic moiety, and n is the valence number of M. In one or more embodiments, M can have an oxidation state of +3 or +4. As used herein, the term "organic moiety" shall denote any chemical group primarily comprised of carbon, oxygen, nitrogen, or hydrogen. As used herein, the terms "primarily," "predominately," and "majority" shall mean more than 50 percent. Additionally, suitable organic moieties can comprise one or more heteroatoms. Furthermore, when n is greater than 2, each R group can be independently selected. In one or more embodiments, M and R of the above formula can be any combination of metals and organic moieties, respectively, that are capable of forming the above-described outer shell when dispersed in a solvent, as discussed in greater detail below. Additionally, although not depicted in the above formula, M can be covalently bonded to the carboxylic acid moiety.

In one or more embodiments, the metal soap can be a di-soap. As used herein, the term "di-soap" shall denote a soap comprising two carboxylic acid groups. Di-soaps can comprise moieties of any of the carboxylic acids describe above. For example, the metal soap can comprise a di-soap of aluminum. In one or more embodiments, the metal soap comprises aluminum di-oleic soap.

As mentioned above, the outer shell of the at least partially hollow nanoparticles can be cross-linked. Accordingly, the outer shell of the at least partially hollow nanoparticles can comprise residues of one or more cross-linking agents. In other embodiments, as will be discussed in greater detail below, the outer shell of the at least partially hollow nanoparticles can be cross-linked via one or more unsaturation points in the hydrocarbyl tail of the above-described carboxylic acids using a free-radical initiator. Accordingly, in one or more embodiments, the outer shell of the at least partially hollow nanoparticles can be substantially free of cross-linking agent residues.

Additionally, in one or more embodiments, the outer shell of the nanoparticles can have a thickness in the range of from about 0.5 to about 40 nanometers ("nm"), in the range of from 1 to 20 nm, or in the range of from 2 to 10 nm. Also, in various embodiments, the outer shell can be substantially spherical in shape. Furthermore, both the inner surface and the outer surface of the outer shell can be substantially spherical in shape. In one or more embodiments, the outer surface of the outer shell can have an average diameter in the range of from about 10 to about 500 nm, in the range of from about 15 to about 250 nm, or in the range of from 20 to 100 nm.

As mentioned above, the at least partially hollow nanoparticles can comprise a continuous inner void space that constitutes at least a portion of the nanoparticle's core. As used herein, the term "continuous inner void space" indicates a space that is a single, uninterrupted volume and does not include any intermolecular, intramolecular, or interatomic void spaces. In one or more embodiments, the at least partially hollow nanoparticles can each comprise one or more continuous inner void spaces.

In one or more embodiments, the continuous inner void space can constitute at least 10 percent, at least 20 percent, at least 30 percent, or at least 40 percent of the volume of the at least partially hollow nanoparticle. Additionally, the continuous inner void space can constitute in the range of from about 10 to about 95 percent, in the range of from about 20 to about 90 percent, or in the range of from 30 to 85 percent of the volume of the at least partially hollow nanoparticle. Furthermore, in a composition comprising a plurality of the at least partially hollow nanoparticles, each nanoparticle can have a continuous inner void space that averages at least 10 percent, at least 20 percent, at least 30 percent, at least 40 percent, in the range of from about 10 to about 95 percent, in the range of form about 20 to about 90 percent, or in the range of from 30 to 85 percent of the volume of each of the at least partially hollow nanoparticles.

The continuous inner void space of the at least partially hollow nanoparticles can have any shape that naturally occurs during formation. In one or more embodiments, the continuous inner void space can be substantially spherical in shape. In one or more embodiments, the continuous inner void space can be disposed within the above-described outer shell of the at least partially hollow nanoparticle. Additionally, the continuous inner void space can have a perimeter defined by the inner surface of the above-described outer shell. In one or more embodiments, the continuous inner void space can have an average diameter of at least 1 nm, in the range of from about 2 to about 499 nm, in the range of from about 5 to about 249 nm, or in the range of from 10 to 99 nm. Furthermore, the continuous inner void space can have a volume of at least 0.5 nm$^3$, in the range of from about 0.5 to about 7×10$^7$ nm$^3$, in the range of from about 50 to about 8×10$^6$ nm$^3$, or in the range of from about 500 to about 5×10$^5$ nm$^3$.

In one or more embodiments, a composition composed of a plurality of the above-described at least partially hollow nanoparticles can have a density of less than 0.8 g/cm$^3$, less than 0.6 g/cm$^3$, or less than 0.4 g/cm$^3$. Additionally, the above-described at least partially hollow nanoparticles can individually have average diameters of 500 nm or less, 250 nm or less, or 100 nm or less. Furthermore, a plurality of the above-described at least partially hollow nanoparticles can have a mean average diameter of 500 nm or less, 250 nm or less, or 100 nm or less.

As mentioned above, the at least partially hollow nanoparticles can initially be prepared by dispersing a metal soap in an organic solvent, followed by cross-linking of the resulting particles. The metal soap suitable for use in the above-described process can be prepared by any methods known in the art. In one or more embodiments, however, the metal soap can be prepared by first forming an initial soap, then combining at least a portion of that initial soap with one or more metal ion donors.

In one or more embodiments, the initial soap can be prepared by first combining a polar solvent, a base, and an organic species containing at least one carboxylic acid group. The base is added to neutralize the acid, facilitating dissolution. The base can be added in an amount sufficient to form a solution having a basic pH (i.e., a pH greater than 7). In one or more embodiments, the amount of base employed during formation of the initial soap can be at least 0.01 weight percent, or in the range of from about 0.02 to about 2 weight percent based on the entire weight of the initial soap solution. Examples of bases suitable for use include, but are not limited to, sodium hydroxide, potassium hydroxide, potassium carbonate, calcium carbonate, and ammonia. In one or more embodiments, the base comprises sodium hydroxide. Additionally, in various embodiments, the initial soap can be an alkali or alkaline earth metal soap.

The polar solvent employed in the above initial procedure can be any known or hereafter discovered polar solvent. Examples of suitable polar solvents include, but are not limited to, water, tetrahydrofuran ("THF"), acetone, acetonitrile, dimethylformamide ("DMF"), dimethyl sulfoxide ("DMSO"), acetic acid, n-butanol, isopropanol, n-propanol, ethanol, and methanol. In one or more embodiments, the polar solvent comprises water. The amount of polar solvent employed during formation of the initial soap can be at least about 50 weight percent, or in the range of from about 70 to about 99 weight percent based on the entire weight of the initial soap solution.

The organic species containing at least one carboxylic acid group in the above initial procedure can be any of the carboxylic acids described above as being suitable for use in the metal soap. For instance, the organic species containing at least one carboxylic acid group can comprise $C_2$ to $C_5$ acids, $C_6$ to $C_{22}$ fatty acids, or higher fatty acids, such as $C_{23}$ to $C_{50}$ fatty acids. In one or more embodiments, the organic species containing at least one carboxylic acid group comprises oleic acid. The organic species containing at least one carboxylic acid group can be present in a molar ratio with the above-described base in the range of from about 1:1 to about 5:1 carboxylic acid-to-base.

Following formation of the initial soap, a metal ion donor can be combined with the initial soap. The metal ion donor can be in the form of a metal ion donor dispersed in a polar solvent, such as those described above as suitable for use in preparing the initial soap. In one embodiment, the polar solvent comprises water.

In one or more embodiments, the metal ion donor can have the following formula:

with M being any metal described above as being suitable for use as the metal component of the metal soap; where Z is selected from a cationic group consisting of potassium sulfate, hydroxide, sulfate, chlorine, phosphate, nitrate, etc.; and a and b are independently integers in the range of from 1 to 20. In one or more embodiments, the metal ion donor can comprise aluminum potassium sulfate.

The above-described metal soap can then be formed by admixing at least a portion of the initial soap with at least a portion of the metal ion donor dispersion. In one or more embodiments, the metal ion donor dispersion can be present in the resulting mixture in an amount sufficient to provide a molar ratio of the metal component of the metal ion donor to the carboxylic acid component of the initial soap in the range of from about 1:10 to about 1:1, or in the range of from 1:4 to 1:1.3 metal-to-carboxylic acid. In one or more embodiments, the metal and carboxylic acid can be present in the resulting mixture in a substantially 1:2 metal-to-carboxylic acid molar ratio.

Following and/or during admixing of the initial soap with the metal ion donor dispersion, the mixture can be stirred and/or heated to promote metal ions from the metal ion donor to associate with the carboxylic acid of the initial soap. Additionally, it should be noted that formation of the metal soap can be encouraged by slowly adding the metal ion donor dispersion to the initial soap. For example, the metal ion donor dispersion can be added to the initial soap at a speed of less than 10 parts metal ion donor per 100 parts initial soap per minute, less than 2 parts metal ion donor per 100 parts initial soap per minute, or less than 1 part metal ion donor per 100 parts initial soap per minute. In one or more embodiments, the resulting metal soap can be insoluble in the polar solvent employed, and can thus be allowed to precipitate out of the mixture. Thereafter, the metal soap can be isolated from the mixture employing any methods known or hereafter developed in the art, such as, for example, filtration. Following isolation, the resulting metal soap can be washed with water, which can remove any unwanted reaction residue precipitates, such as, for example, potassium sulfate.

Following formation of the metal soap, the above-described at least partially hollow nanoparticles can initially be prepared by dispersing at least a portion of the metal soap in a non-polar solvent. This can allow the metal soap molecules to form the above-described outer shells of the at least partially hollow nanoparticles. The amount of non-polar solvent employed can be any amount sufficient to form the above described at least partially hollow nanoparticles. In one or more embodiments, the non-polar solvent can be present in the resulting dispersion in an amount of at least 80 weight percent based on the entire weight of the metal soap and non-polar solvent mixture.

Non-polar solvents suitable for use can be any non-polar solvent that allows formation of the above-described at least partially hollow nanoparticles. Examples of suitable non-polar solvents include, but are not limited to, hexane, benzene, cyclohexane, and toluene. Although not wishing to be bound by theory, it is believed that the size of the resulting at least partially hollow nanoparticles can be varied by selecting the type of non-polar solvent employed. For example, the alkyl size and/or branch structure of the non-polar solvent may have an effect on the particle size of the resulting at least partially hollow nanoparticles.

Following formation, at least a portion of the initial at least partially hollow nanoparticles in the non-polar solvent can be cross-linked. Accordingly, in one or more embodiments, a cross-linking agent can be added to the mixture containing the at least partially hollow nanoparticles. Any cross-linking agent can be employed that induces cross-linking of the metal soap molecules forming the outer shell of the at least partially hollow nanoparticles. In one or more embodiments, the cross-linking agent employed can be one that does not become part of the cross-linked structure. For example, a free radical initiator can be employed that induces cross-linking at the unsaturation points of carboxylic acid groups of the metal soap molecules. Suitable free radical initiators include organic peroxides and azo compounds, such as, for example, azobisisobutyronitrile. The amount of cross-linking agent employed can be any amount sufficient to cross-link at least a portion of the metal soap molecules. In one or more embodiments, the cross-linking agent can be present in a molar ratio with the carboxylic acid groups of the metal soap in the range of from about 1:1,000 to about 1:2 cross-linking agent-to-carboxylic acid groups. Following cross-linking, the resulting cross-linked at least partially hollow nanoparticles can be isolated, if desired, and employed in one or more of a variety of applications, such as those described below.

As mentioned above, the at least partially hollow nanoparticles are suited for use in a variety of applications. For example, the at least partially hollow nanoparticles can be dispersed in a rubber matrix for use in various industries, including, but not limited to, tire manufacture. For instance, the at least partially hollow nanoparticles can be employed as performance-enhancing modifiers in thermoplastic, thermoplastic elastomer, and elastomeric compositions. In fact, a variety of applications are contemplated for use in conjunction with the at least partially hollow nanoparticles of the present invention. All forms of the present inventive nanoparticles are, of course, contemplated for use in each of the exemplary applications and all other applications envisioned by one skilled in the art.

In one or more embodiments, the at least partially hollow nanoparticles may be blended with a rubber to improve the physical characteristics of the rubber composition. Rubber compositions prepared according to this invention can comprise the at least partially hollow nanoparticles in an amount of at least 1 weight percent, in the range of from about 2 to about 80 weight percent, or in the range of from 5 to 40 weight percent based on the weight of the rubber. The at least partially hollow nanoparticles can be useful modifying agents for rubbers because they can be discrete particles which are capable of dispersing uniformly throughout a rubber composition, resulting in substantial uniformity of physical characteristics. The present at least partially hollow nanoparticles are suitable for modifying a variety of rubbers, including, but not limited to, random styrene/butadiene copolymers, butadiene rubber, poly(isoprene), nitrile rubber, polyurethane, butyl rubber, ethylene propylene diene monomer ("EPDM"), and the like.

One application for nanoparticle-containing rubber compounds is in tire rubber formulations. Vulcanizable elastomeric compositions in certain embodiments can be prepared by mixing a rubber and a nanoparticle composition with a reinforcing filler comprising silica, a carbon black, or a mixture of the two. The composition can also comprise a processing aid and/or a coupling agent, a curing agent, and/or an effective amount of sulfur to achieve a satisfactory cure of the composition.

Rubbers suitable for use to make tire rubber formulations include, but are not limited to, conjugated diene polymers, copolymers or terpolymers of conjugated diene monomers and monovinyl aromatic monomers (e.g., alkenylbenzene monomers). These can be utilized as 100 parts of the rubber in the tread stock compound, or they can be blended with any conventionally employed treadstock rubber, including natural rubber, synthetic rubber, and blends thereof. Such rubbers are well known to those skilled in the art, commercially available, and include, but are not limited to, synthetic polyisoprene rubber, styrene-butadiene rubber ("SBR"), styrene-isoprene rubber, styrene-isoprene-butadiene rubber, butadiene-isoprene rubber, polybutadiene, butyl rubber, neoprene, acrylonitrile-butadiene rubber ("NBR"), silicone rubber, the fluoroelastomers, ethylene acrylic rubber, ethylene-propylene rubber, ethylene-propylene terpolymer, ethylene vinyl acetate copolymer, epichlorohydrin rubber, chlorinated polyethylene-propylene rubbers, chlorosulfonated polyethylene rubber, hydrogenated nitrile rubber, tetrafluoroethylene-propylene rubber, and the like.

Examples of reinforcing silica fillers which can be used in the vulcanizable elastomeric compositions include wet silica (hydrated silicic acid), dry silica (anhydrous silicic acid), calcium silicate, and the like. Such reinforcing fillers are commercially available. Other suitable fillers include aluminum silicate, magnesium silicate, and the like. In one embodiment, precipitated amorphous wet-process, hydrated silicas can be employed. Silica can be employed in an amount of about 1 to about 100 pphr, in an amount of about 5 to 80 pphr, or in an amount of 30 to 80 pphr. In another embodiment, silica can be employed in an amount of at least 20 pphr, at least 40 pphr, or at least 60 pphr. Examples of commercially available silica fillers which can be used in the present invention include, but are not limited to, HI-SIL 190, HI-SIL 210, HI-SIL 215, HI-SIL 233, HI-SIL 243, and the like, produced by PPG Industries of Pittsburgh, Pa., U.S.A. A number of useful commercial grades of different silicas are also available from DeGussa Corporation (e.g., VN2, VN3), Rhone Poulenc (e.g., ZEOSIL 1165 MP0), and J. M. Huber Corporation.

In one or more embodiments, the rubber compositions of the present invention can be compounded with any form of carbon black, and optionally additionally with silica, as described above. The carbon black can be present in amounts ranging from about 1 to about 100 pphr. The carbon black can include any commonly available, commercially-produced carbon black. In one embodiment, carbon blacks having a surface area of at least 20 $m^2/g$, or in the range of from 35 $m^2/g$ to 200 $m^2/g$, can be used in the present invention. Among useful carbon blacks are furnace black, channel blacks, and lamp blacks. A mixture of two or more of the above blacks can be used in preparing the carbon black products of the present invention. Examples of suitable carbon blacks useful in the present invention include, but are not limited to, N-110, N-220, N-339, N-330, N-352, N-550, N-660, as designated by ASTM D-1765-82a.

Certain additional fillers can also be utilized in the vulcanizable elastomeric compositions of the present invention, including mineral fillers, such as clay, talc, aluminum hydrate, aluminum hydroxide, and mica. The foregoing additional fillers are optional and can be utilized in an amount in the range of from about 0.5 to about 40 parts per hundred of rubber ("pphr").

Numerous coupling agents and compatibilizing agents are known for use in combining silica and rubber, and can also be employed in the present invention. Silica-based coupling and compatibilizing agents suitable for use include, but are not limited to, silane coupling agents containing polysulfide components, or structures such as, for example, trialkoxyorganosilane polysulfides, containing from about 2 to about 8 sulfur atoms in a polysulfide bridge such as, for example, bis-(3-triethoxysilylpropyl) tetrasulfide ("Si-69"), bis-(3-triethoxysilylpropyl) disulfide ("Si-75"), and alkyl alkoxysilanes, such as octyltriethoxy silane, and hexyltrimethoxy silane.

It will be readily understood by those skilled in the art that the rubber composition can be compounded by methods generally known in the rubber compounding art, such as mixing the various vulcanizable polymer(s) with various commonly used additive materials such as, for example, curing agents, activators, retarders and accelerators, processing additives, such as oils, resins (including tackifying resins), plasticizers, pigments, additional fillers, fatty acids, zinc oxide, waxes, antioxidants, anti-ozonants, and peptizing agents. As known to those skilled in the art, depending on the intended use of the sulfur vulcanizable and sulfur vulcanized material (rubbers), the additives mentioned above can be selected and commonly used in typically known amounts.

In one or more embodiments of the present invention, the above-described nanoparticle-containing rubber compounds can be used to make tire treads and/or side walls of tires due to the enhanced reinforcement capabilities provided by inclusion of the present at least partially hollow nanoparticles. The inclusion of the at least partially hollow nanoparticles can lead to improved cornering, handling, traction (including traction in dry, wet, and snowy conditions), rolling resistance, dispersion, and aging properties of the resultant tire compositions.

Another application for such rubber compounds can be in conditions requiring superior damping properties, such as engine mounts and hoses (e.g., air conditioning hoses). Rubber compounds having high mechanical strength, super damping properties, and strong resistance to creep are preferred by engine mount manufacturers. In engine mounts, a rubber, because it sits most of its life in a packed and hot position, requires excellent high temperature characteristics. Utilizing the at least partially hollow nanoparticles of the present invention within select rubber formulations can sufficiently improve the characteristics of the rubber compounds to such a degree as to enable them to be employed in engine mount applications.

The at least partially hollow nanoparticles prepared in accordance with the present invention may also find application in hard disk technology. Disk drive assemblies for computers traditionally include a magnetic storage disk coaxially mounted about a spindle apparatus that rotates at speeds in excess of several thousand revolutions per minute ("RPM"). The disk drive assemblies also include a magnetic head that reads and writes information to and from the magnetic storage disk while the magnetic disk is rotating. The magnetic head is usually disposed at the end of an actuator arm and is positioned in a space above the magnetic disk. The actuator arm can move relative to the magnetic disk. The disk drive assembly is mounted on a disk base (support) plate and sealed with a cover plate to form a housing that protects the disk drive assembly from environmental contaminants outside of the housing.

Serious damage to the magnetic disks, including loss of valuable information, can result by introducing gaseous and particulate contaminates into the disk drive assembly housing. To substantially prevent or reduce the introduction of gaseous and particulate contaminants into the disk drive housing, a flexible sealing gasket is disposed between the disk drive mounting base (support) plate and the disk drive assembly housing or cover plate. A sealing gasket is usually prepared by punching out a ring-shaped gasket from a sheet of cured elastomer. The elastomeric gasket obtained is usually attached to the base plate of the disk drive assembly mechanically, such as affixing the gasket with screws, or adhesives. In one embodiment, the at least partially hollow nanoparticles, when compounded with a polyalkylene and a rubber, may present a tensile strength comparable to that suitable for use in hard disk drive compositions.

The at least partially hollow nanoparticles prepared in accord with the present invention can also be blended with a variety of thermoplastic elastomers, such as poly(styrene-ethylene-propylene-styrene) ("SEPS"), polyer(styrene-ethylene-butylene-styrene) ("SEBS"), EEBS, EEPE, polypropylene, polyethylene, and polystyrene. These blends of thermoplastic elastomers and nanoparticles may also be extended via the inclusion of one or more extending agents.

For example, suitable extending agents include extender oils and low molecular weight compounds or components. Suitable extender oils include those well known in the art such as, for example, naphthenic, aromatic and paraffinic petroleum oils and silicone oils.

Examples of low molecular weight organic compounds or components useful as extenders in compositions are low molecular weight organic materials having a number-average molecular weight of less than 20,000, less than 10,000, or less than 5,000. Such compounds or components are commercially available. Although there is no limitation on the material which may be employed, the following is a non-exhaustive list of examples of appropriate materials that can be used as extending agents:

(1) Softening agents, such as aromatic naphthenic and parraffinic softening agents for rubbers or resins;
(2) Plasticizers, such as plasticizers composed of esters including phthalic, mixed pthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;
(3) Tackifiers, such as coumarone resins, coumaronein-dene resins, terpene phenol resins, petroleum hydrocarbons and rosin derivatives;
(4) Oligomers, such as crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins;
(5) Lubricants, such as hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and,
(6) Petroleum hydrocarbons, such as synthetic terpene resins, aromatic hydrocarbon resins, aliphatic hydrocarbon resins, aliphatic or alicyclic petroleum resins, polymers of unsaturated hydrocarbons, and hydrogenated hydrocarbon resins.

Other appropriate low-molecular weight organic materials suitable for use as extenders include latexes, emulsions, liquid crystals, bituminous compositions, and phosphazenes. Additionally, two or more of the above-described materials may be used in combination as extending agents in the present invention.

When an extending agent is employed in the above-described compositions, the extending agent can be present in an amount of at least 0.5 pphr, in the range of from about 1 to about 80 pphr, in the range of from about 3 to about 50 pphr, or in the range of from 5 to 30 pphr.

In another embodiment of the present invention, the at least partially hollow nanoparticles can be added into typical plastic materials, including polyethylene, polypropylene, polystyrene, polycarbonate, nylon, polyimides, and the like. Inclusion of at least partially hollow nanoparticles in such materials can enhance impact strength, tensile strength, and damping properties. Any methods known in the art for including an additive in plastics may be employed in the present invention.

It should be noted that employment of the at least partially hollow nanoparticles are not limited to the exemplary embodiments just described. The at least partially hollow nanoparticles may also be suited to other existing or hereafter discovered applications for nanoparticles, including, but not limited to, the medical field (e.g., drug delivery and blood applications), information technology (e.g., quantum computers and dots), aeronautical and space research, and energy (e.g., oil refining and lubricants).

This invention can be further illustrated by the following examples of various embodiments thereof, although it will be understood that these examples are included merely for purposes of illustration and are not intended to limit the scope of the invention unless otherwise specifically indicated.

EXAMPLES

Example 1

Preparation of Aluminum Di-oleic Soap

Initially, a sodium soap was prepared by adding 1,600 ml of deionized water, 14.2 g of sodium hydroxide (≥99% purity; Sigma-Aldrich, St. Louis, Mo., USA), and 100 g of oleic acid (99.9% purity; Sigma-Aldrich, St. Louis, Mo., USA) to a ½-gallon bottle. The resulting mixture was then vigorously mixed via magnetic stirring at 75° C. for one hour. After mixing, the resulting solution was transparent. For ease of reference, this initial solution shall be referred to as solution A.

Next, to a separate 2,000-ml glass bottle was added 800 ml of deionized water and 84.20 g of aluminum potassium sulfate dodecahydrate (≥99% purity; Sigma-Aldrich, St. Louis, Mo., USA). This mixture was then vigorously mixed via magnetic stifling at 75° C. for one hour. After mixing, the resulting solution was transparent. For ease of reference, this second solution shall be referred to as solution B.

Following preparation of both of the above-described solutions, solution B was added slowly over a period of approximately 10 minutes into solution A while vigorously mixing via magnetic stirring. The resulting aluminum di-oleic soap was allowed to precipitate out of solution. The precipitate was then washed eight times with pure water (i.e., deionized and distilled). Thereafter, the precipitate was dried overnight under vacuum at 65° C.

Example 2

Preparation of Hollow Particles

To an 80-ml glass bottle was added 0.2 g of the product synthesized in Example 1 along with 50 ml of toluene. The solid product was dissolved in the toluene at 70° C. under vigorous magnetic stirring for about one hour. This solution shall be referred to as solution C. Thereafter, a small drop of solution C was deposited on a carbon coated micro-grid, after which the solvent was allowed to evaporate for approximately one hour. Following evaporation, the grid was directly examined under transmission electron microscopy ("TEM"). The resulting TEM analysis indicated that the aluminum di-oleic soap prepared in Example 1 and dissolved in toluene had formed hollow particle structures.

Thereafter, the remaining solution C was further filtered through a 0.2 μm paper filter (Thermo Fisher Scientific, Waltham, MA, USA). Then, a small drop of the filtered solution C was deposited on a carbon coated micro-grid, after which the solvent was allowed to evaporate for approximately one hour. Following evaporation, the grid was directly examined via TEM. The resulting TEM analysis also indicated formation of hollow particle structures.

Example 3

Preparation of Cross-linked Hollow Particles

To the filtered solution C prepared in Example 2 was added 0.1 percent of azobisisobutyronitrile ("AIBN"). Then, the bottle containing the resulting solution was placed in a water bath at 80° C. for about one hour. Thereafter, a small drop of the resulting solution was deposited on a carbon coated micro-grid. After allowing the solvent to evaporate for approximately one hour, the grid was directly examined via TEM. The resulting TEM analysis also indicated formation of hollow particle structures.

Example 4

Film Preparation from Cross-Linked Hollow Particles

A thin film was cast using a portion of the solution prepared according to the procedure described in Example 3. To prepare the film, the solution was poured into a pan where the solvent was allowed to evaporate. After the solvent was completely evaporated, the density of the resulting film was determined by weighing the film in air and then dividing by the film dimensions. The resulting film had a height and width of about 5 mm, a thickness of approximately 0.2 mm, and weighed about 1.5 mg, thus presenting a density of approximately 0.3 g/cm$^3$. When compared to the aluminum soap initially prepared in Example 1, which had a density of about 0.95 g/cm$^3$, it is apparent that the sample prepared in Example 3 is significantly less dense. This discrepancy in density indicates the presence of a large amount of void space in the sample prepared in Example 3.

SELECTED DEFINITIONS

It should be understood that the following is not intended to be an exclusive list of defined terms. Other definitions may be provided in the foregoing description accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements recited after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

What is claimed is:

1. A composition comprising:
an at least partially hollow nanoparticle having an outer shell comprising one or more molecules and/or residues derived from a metal soap, the metal soap including a metal and a carboxylate group, the outer shell comprising the metal and the carboxylate group;
wherein said at least partially hollow nanoparticle comprises at least one continuous inner void space that constitutes at least 10 percent of the volume of said nanoparticle;
wherein the metal of said metal soap comprises a transition metal, a post-transition metal, a metalloid, a lanthanoid, and/or an actinoid;
wherein the metal of said metal soap has a valence of at least 3.

2. The composition of claim 1, wherein said composition comprises a plurality of said at least partially hollow nanoparticles, wherein said composition has a density of less than 0.6 g/cm$^3$.

3. The composition of claim 1, wherein said inner void space has an average diameter of at least 1 nm.

4. The composition of claim 1, wherein said inner void space has an average diameter in the range of from about 2 to about 499 nm.

5. The composition of claim 1, wherein said outer shell has an average thickness in the range of from about 0.5 to about 40 nm.

6. The composition of claim 1, wherein said at least partially hollow nanoparticle has an average diameter of 500 nm or less.

7. The composition of claim 1, wherein at least a portion of said molecules and/or residues derived from a metal soap are cross-linked.

8. The composition of claim 1, wherein said metal soap has the formula:

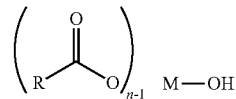

wherein M represents the metal of said metal soap and has an oxidation state of +3 or +4, wherein R is any organic moiety having at least one unsaturated C—C bond, wherein n is the valence number of M.

9. The composition of claim 1, wherein the metal of said metal soap comprises at least one metal selected from the group consisting of Group III (IUPAC Group 13) metals or transition metals excluding zinc, nickel, and copper.

10. The composition of claim 1, wherein the metal of said metal soap comprises at least one metal selected from the group consisting of aluminum, iron, titanium, and cobalt.

11. The composition of claim 1, wherein said carboxylate group comprises at least 6 carbon atoms and at least one unsaturated C—C bond.

12. The composition of claim 1, wherein said carboxylate group comprises oleic acid.

13. The composition of claim 1, wherein the metal of said metal soap is covalently bonded to said carboxylate group.

14. The composition of claim 1, wherein said metal soap comprises a di-soap of aluminum.

15. The composition of claim 1, wherein said metal soap comprises an aluminum di-oleic soap.

16. The composition of claim 1, wherein said metal soap is not soluble in water.

17. The composition of claim 1, wherein said metal soap is biocompatible.

18. The composition of claim 1, further comprising a non-polar solvent within which a plurality of said at least partially hollow nanoparticles are dispersed.

19. A rubber composition comprising: a rubber matrix having dispersed therein a plurality of at least partially hollow nanoparticles having an outer shell comprising one or more molecules and/or residues derived from a metal soap, wherein said at least partially hollow nanoparticles each have at least one continuous inner void space that averages at least 10 percent of the volume of each of said at least partially hollow nanoparticles.

20. The rubber composition of claim 19, wherein the metal of said metal soap comprises a transition metal, a post-transition metal, a metalloid, a lanthanoid, and/or an actinoid.

21. The rubber composition of claim 19, wherein said inner void space has an average diameter in the range of from about 2 to about 499 nm.

22. The rubber composition of claim 19, wherein said outer shell has an average thickness in the range of from about 0.5 to about 40 nm.

23. The rubber composition of claim 19, wherein said metal soap has the formula:

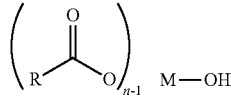

wherein M represents the metal of said metal soap and has an oxidation state of +3 or +4, wherein R is any organic moiety having at least one unsaturated C—C bond, wherein n is the valence number of M.

24. The rubber composition of claim 19, wherein the metal of said metal soap comprises at least one metal selected from the group consisting of aluminum, iron, titanium, and cobalt.

25. The rubber composition of claim 19, wherein said metal soap comprises at least one derivative of a carboxylic acid having at least 6 carbon atoms and at least one unsaturated C—C bond.

26. The rubber composition of claim 25, wherein said carboxylic acid comprises oleic acid.

27. The rubber composition of claim 25, wherein the metal of said metal soap is covalently bonded to said derivative of carboxylic acid.

28. The rubber composition of claim 19, wherein said metal soap comprises an aluminum di-oleic soap.

29. The rubber composition of claim 19, wherein at least a portion of said molecules and/or residues derived from a metal soap are cross-linked.

30. The rubber composition of claim 19, wherein said rubber matrix comprises at least one conjugated diene polymer.

31. The rubber composition of claim 19, wherein said rubber matrix comprises copolymers comprising the residues of conjugated diene monomers and the residues of alkenylbenzene monomers.

32. The rubber composition of claim 19, wherein said rubber matrix comprises synthetic polyisoprene rubber, styrene-butadiene rubber, styrene-isoprene rubber, styrene-isoprene-butadiene rubber, butadiene-isoprene rubber, polybutadiene, butyl rubber, neoprene, acrylonitrile-butadiene rubber, silicone rubber, fluoroelastomers, ethylene acrylic rubber, ethylene-propylene rubber, ethylene-propylene terpolymer, ethylene vinyl acetate copolymer, epichlorohydrin rubber, chlorinated polyethylene-propylene rubbers, chlorosulfonated polyethylene rubber, hydrogenated nitrile rubber, tetrafluoroethylene-propylene rubber, or mixtures thereof.

33. The rubber composition of claim 19, wherein said rubber composition comprises said at least partially hollow nanoparticles in a concentration in the range of from about 2 to about 80 weight percent based on the weight of said rubber matrix.

34. A composition comprising:
an at least partially hollow nanoparticle having an outer shell comprising one or more molecules and/or residues derived from a metal soap;
wherein said at least partially hollow nanoparticle comprises at least one continuous inner void space that constitutes at least 10 percent of the volume of said nanoparticle;
wherein the metal of said metal soap comprises a transition metal, a post-transition metal, a metalloid, a lanthanoid, and/or an actinoid;
wherein at least a portion of said molecules and/or residues derived from a metal soap are cross-linked, and the outer shell comprises said crosslinked portion.

35. The composition of claim 34, wherein the molecules and/or residues derived from a metal soap comprise the metal and a derivative of a carboxylic acid.

36. The composition of claim 34, wherein the metal of said metal soap comprises at least one metal selected from the group consisting of aluminum, iron, titanium, and cobalt.

37. The composition of claim 34, wherein said metal soap comprises a di-soap of aluminum.

38. The composition of claim 34, wherein said metal soap comprises an aluminum di-oleic soap.

39. The composition of claim 34, wherein said metal soap is not soluble in water.

40. The composition of claim 34, wherein said metal soap is biocompatible.

41. The composition of claim 34, further comprising a non-polar solvent within which a plurality of said at least partially hollow nanoparticles are dispersed.

42. The composition of claim 41, wherein the non-polar solvent is hexane, benzene, cyclohexane, and toluene.

43. The composition of claim 35, wherein the carboxylic acid is selected from propionic acid, butyric acid, valeric acid, caproic acid, enanthic acid, caprylic acid, pelargonic acid, capric acid, lauric acid, myristic acid, palmitic acid, stearic acid, arachidic acid, and ethylhexanoic acid.

44. The composition of claim 34, wherein said composition comprises a plurality of said at least partially hollow nanoparticles, wherein said composition has a density of less than 0.6 g/cm$^3$.

45. The composition of claim 34, wherein said inner void space has an average diameter of at least 10 nm.

46. The composition of claim 1, wherein said metal soap comprises a di-soap.

* * * * *